United States Patent [19]
Kannapell

[11] 3,891,248
[45] June 24, 1975

[54] EXPANSION JOINT

[75] Inventor: David H. Kannapell, Prospect; Philipp P. Schupp, La Grange; David L. Amrein, Louisville, all of Ky.

[73] Assignee: American Air Filter Company, Inc., Louisville, Ky.

[22] Filed: May 9, 1974

[21] Appl. No.: 468,556

[52] U.S. Cl. ............... 285/156; 285/224; 285/363; 403/337
[51] Int. Cl. .......... F16l 41/00; F16l 51/00
[58] Field of Search ............ 285/156, 49, 159, 224, 285/332.4, 363, 405, DIG. 6, 368, 223; 64/2, 8, 10, 11 R, 27 NM; 241/100.5; 403/4, 336, 337

[56] References Cited
UNITED STATES PATENTS

| 992,022 | 5/1911 | Matthews | 285/363 X |
| 1,799,855 | 4/1931 | Mample | 285/368 X |
| 1,820,750 | 8/1931 | Lord | 403/337 X |
| 3,519,289 | 7/1970 | Haffer | 285/49 |
| 3,695,643 | 10/1972 | Schmunk | 285/156 |

FOREIGN PATENTS OR APPLICATIONS

| 101,531 | 7/1937 | Australia | 285/50 |

Primary Examiner—Richard J. Scanlan, Jr.
Assistant Examiner—Moshe I. Cohen

[57] ABSTRACT

An expansion device including two conduit members attached in fluid tight relationship with expansion means disposed therebetween which allows expansion in both horizontal and vertical direction.

7 Claims, 3 Drawing Figures

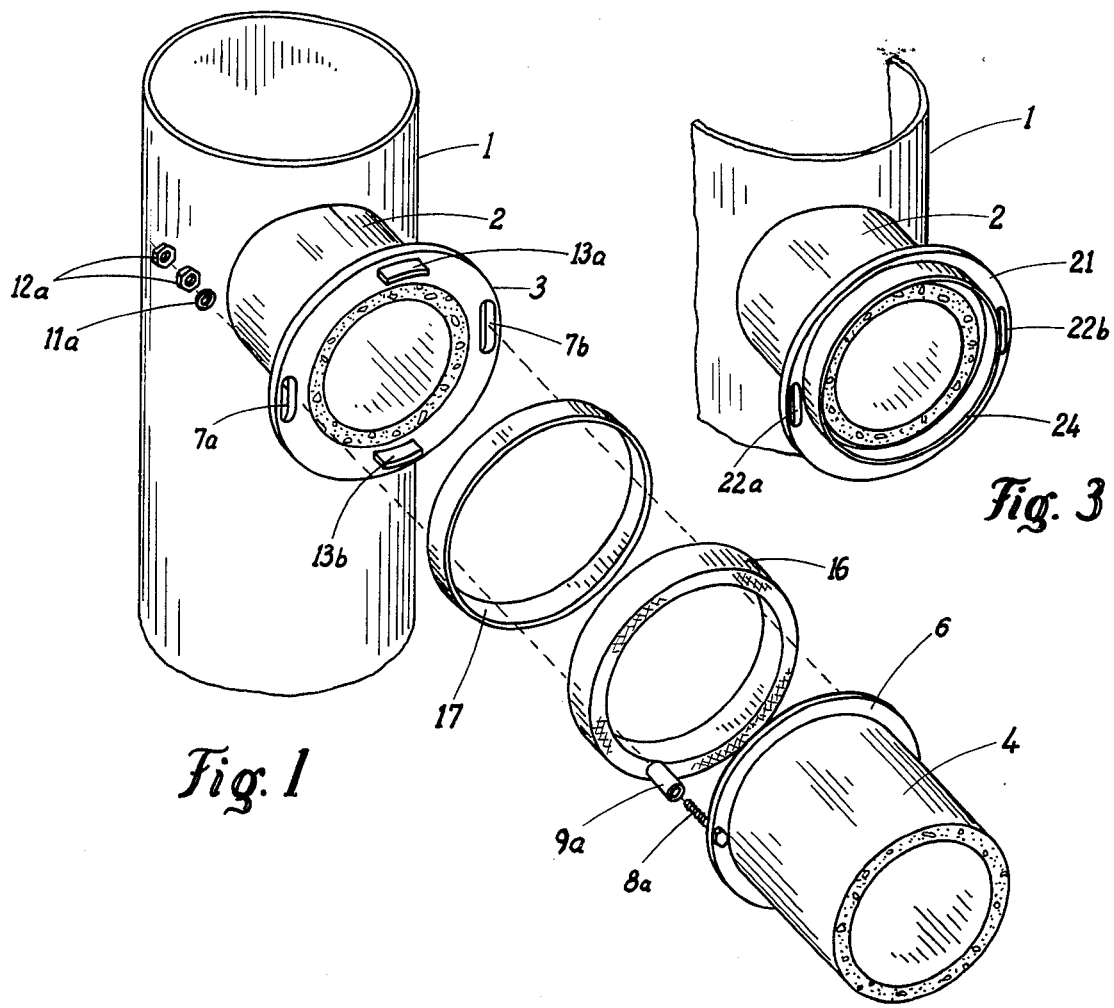
Fig. 1
Fig. 3
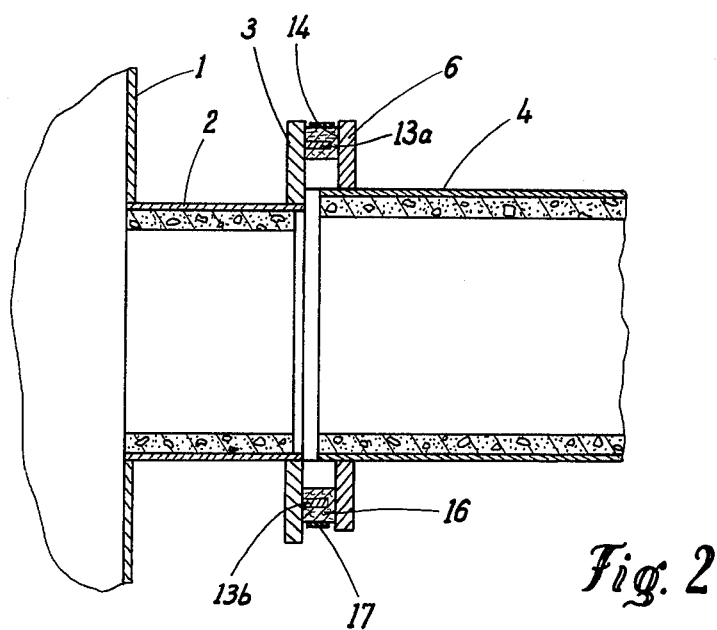
Fig. 2

EXPANSION JOINT

BACKGROUND OF THE INVENTION

The present invention relates to an expansion device at the juncture of two conduits and more particularly relates to an expansion device for two conduits which allows for expansion in both horizontal and vertical direction.

In the removal of hot gases from stoves, furnaces and the like wherein the gases are transferred through conduits, some of the conduits being in a horizontal position while others are in a vertical position, at the juncture of these conduits difficulty has been experienced in providing leakproof or fluid tight joints. Upon expansion of the conduit members during heating, and upon contraction during cooling, interfitting portions of the conduits move relative to each other thereby causing leakage at the joints.

SUMMARY OF THE INVENTION

In the present invention it is recognized that it is desirable to provide an expansion device at the juncture of two conduits. It is further recognized that it is desirable to provide an expansion device at the juncture of two conduits which permits expansion and contraction in both horizontal and vertical directions. Also, it is recognized that it is desirable to provide an expansion device at the juncture of two conduits which is fluid tight upon expansion and contraction of either of the conduits.

The present invention advantageously provides a straightforward arrangement for an expansion device at the juncture of two conduits. The present invention further advantageously provides an expansion device at the juncture of two conduit members which allows for expansion and contraction in both a horizontal and vertical direction with a minimum of working parts and in a straightforward and economical manner.

Various other features of the present invention will become obvious to those skilled in the art upon reading the disclosure set forth hereinafter.

More particularly, the present invention provides an expansion device comprising: first and second longitudinally extending conduit members disposed to be joined in flow through communication one with the other; the first conduit member having a radially outward extending flange on one end thereof, the flange having a plurality of slotted openings therein and stop means thereon extending outwardly therefrom substantially parallel with the longitudinal axis of the first conduit member; a second conduit member having an outwardly extending flange on one end thereof, the flange having a plurality of apertures therein, the apertures being spaced from and in alignment with the slotted openings; flexible package means disposed between and in communication with the first conduit flange and the second conduit flange in fluid tight relation; and, fastening means extending through the slotted openings of the first conduit flange and the apertures of the second conduit flange whereby the conduits are held together in a flow through fluid tight connection.

It is to be understood that the description of the examples of the present invention given hereinafter are not by way of limitation. Various modifications within the scope of the present invention will occur to those skilled in the art upon reading the disclosure set forth hereinafter.

Referring to the drawings:

FIG. 1 is an exploded view, in perspective, of a preferred expansion device of the present invention;

FIG. 2 is a vertical cross-sectional view of the expansion device of FIG. 1; and, FIG. 3 is a perspective view of a conduit illustrating one preferred horizontal stop means of the present invention.

Referring to FIG. 1 of the drawings, a T-shaped conduit 1 including a transversely extending conduit portion 2 is provided with a flange 3 extending radially outward from the periphery thereof. Conduit portion 2 is in alignment with and spaced from conduit 4 which is provided with a flange portion 6 extending radially outward from the periphery thereof in forced opposed relationship with flange 3 for fastening thereto in flow through, fluid tight relation.

The flange 3 is provided with a pair of spaced opposed vertically disposed rectangular shaped slots 7a and 7b which are adapted to receive fastening means therethrough, such as bolt 8a and conduit spacing sleeve 9a. The outer diameter of conduit spacer sleeve 9a is less than the width of the slotted opening 7a wherein the sleeve 9a rests within the slotted opening 7a. The inner diameter of the sleeve 9a is greater than the diameter of the bolt 8a so that the bolt 8a is received by and extends through the sleeve 8a for communication with washer 11a and nuts 12a. The washer 11a has an outside diameter which is greater than the width of the slot 7a so that when the bolt 8a is in fastening communication with the nuts 12a and upon contraction of either conduit 2 or 4, fastening means will not pass through the slotted openings 7a. Fastening means (not shown) including a bolt, sleeve and appropriate nuts are also provided on the opposite side for communicating with slotted opening 7b in the same manner. As noted previously, the slotted openings 7a and 7b are of rectangular configuration and are vertically disposed so that if the conduit 2 or the conduit 4 moves in a vertical direction due to expansion or contraction of the conduit, fastening means are adaptable for movement either in a vertically downward or upward direction.

Flange 3 is further provided with outwardly extending stop means, exemplified as a pair of opposed outwardly extending fingers 13a and 13b. As shown in FIG. 2 outwardly extending fingers 13 are adjacent to but spaced from the face of the flange 6 whereupon coupling of flange 3 with the flange 6, the faces of the flanges 3 and 6 are spaced a preselected distance apart. Furthermore, the distance between the outwardly extending tip of the fingers 13a and 13b and the surface of the flanges is the maximum amount of horizontal expansion allowable for the conduits 2 and 4.

Disposed between the flanges 3 and 6 is a flexible compressible packing gasket 16 and a cylindrical ring member 17 which is disposed to circumferentially surround the outer periphery of the packing gasket 16. The type of gasket material utilized is a flexible material which upon expansion and contraction provides a fluid tight seal around the juncture of the conduits 2 and 4, such as Fibrafax, a product of Carborundum, Inc., or the like. And, as shown in FIG. 2, the fingers 13a and 13b are embedded into the flexible packing gasket 16.

In operation, the expansion device of the present invention permits movement of either conduit 2 or 4 in a vertical position, the amount of movement being limited to the length of the slotted openings 7a and 7b. At the same time, the conduits are free to expand or contract in a horizontal position a distance equal to the difference between the length of the fastening means and the length of the stop means 13.

Referring now to FIG. 3 which exemplifies another preferred embodiment of the expansion device of the present invention, the T-shaped conduit 1 including the horizontally extending conduit portion 2 includes a flange portion 21 thereon which includes rectangular shaped slot means 22a and 22b and is provided with a stop means which is exemplified as an outwardly extending arcuate portion 24 which is adapted to mate with flexible gasket 16 as shown in FIGS. 1 and 2. Ring 24 is provided in the same manner as fingers 13a and 13b to limit the horizontal expansion of the conduits.

It will be realized that various changes may be made to specific embodiments shown and described without departing from the principals of the present invention.

What is claimed is:

1. An expansion device which allows for expansion and contraction along an axis longitudinal to said device and along an axis normal to said device comprising: first and second longitudinally extending conduit members joined in flow communication one with the other; said first conduit member having a radially outward extending flange at one end thereof, said flange having a pair of opposed spaced vertically extending slotted openings, with respect to said longitudinally extending conduit members, therein and stop means thereon extending outwardly therefrom substantially parallel with the longitudinal axis of said first conduit member; said second conduit member having a radially outward extending flange on one end thereof facingly opposed to said flange on said first conduit, said flange on said second conduit having a pair of opposed apertures therein, said apertures spaced from and in alignment with said slotted openings on the flange of said first conduit; flexible packing means disposed between said opposed flanges and in communication with said first conduit flange and said second conduit flange in fluid tight relation, said stop means extending a preselected distance, said distance being less than the thickness of said packing means in a noncompressed state; and, fastening means extending through said slotted openings of said first conduit flange and said apertures of said second conduit flange whereby said conduits are held together in a flow through fluid tight connection.

2. The expansion device of claim 1 wherein said stop means is a pair of opposed outwardly extending fingers.

3. The expansion device of claim 1 wherein said stop means is an outwardly projecting arcuate ring extending circumferentially along the face of said first conduit flange.

4. The expansion device of claim 1 wherein said stop means is embedded into said flexible packing means.

5. The fastening device of claim 1 wherein said fastening means is cylindrically shaped with a diameter less than the width of said slotted openings.

6. The expansion device of claim 1 including an outer ring disposed circumferentially around the outer surface of said flexible packing means, said ring being in spaced relation with said flanges.

7. The expansion device of claim 1 wherein said first conduit member is of T-shaped cross-section.

* * * * *